United States Patent
Basura et al.

(10) Patent No.: US 6,616,752 B1
(45) Date of Patent: Sep. 9, 2003

(54) LIGHTWEIGHT CONCRETE

(75) Inventors: Danko Basura, Chur (CH); Daniel Engi, Trimmis (CH)

(73) Assignee: Misapor AG, Landquart (CH)

( * ) Notice: Subject to any disclaimer, the term of this patent is extended or adjusted under 35 U.S.C. 154(b) by 0 days.

(21) Appl. No.: 09/958,941

(22) PCT Filed: Apr. 14, 2000

(86) PCT No.: PCT/CH00/00219
§ 371 (c)(1),
(2), (4) Date: Oct. 16, 2001

(87) PCT Pub. No.: WO00/63132
PCT Pub. Date: Oct. 26, 2000

(30) Foreign Application Priority Data

Apr. 16, 1999 (EP) .............................. 99810318

(51) Int. Cl.[7] .............................. C04B 28/10
(52) U.S. Cl. ...................................... 106/716
(58) Field of Search ........................ 106/716

(56) References Cited

U.S. PATENT DOCUMENTS

| | | | | |
|---|---|---|---|---|
| 3,955,992 A | * | 5/1976 | Roberts | 106/724 |
| 4,086,098 A | | 4/1978 | Le Ruyet | |
| 5,641,815 A | * | 6/1997 | Fehlmann | 521/154 |
| 5,775,604 A | * | 7/1998 | Sato | 241/24.22 |
| 5,849,218 A | * | 12/1998 | Johansen et al. | 252/301.4 R |
| 6,057,257 A | * | 5/2000 | Morano et al. | 501/53 |
| 6,084,011 A | * | 7/2000 | Lucero et al. | 524/5 |
| 6,368,527 B1 | * | 4/2002 | Gontmakher et al. | 264/42 |
| 6,403,688 B1 | * | 6/2002 | Luongo | 524/423 |

FOREIGN PATENT DOCUMENTS

| | | |
|---|---|---|
| BE | 696 632 A | 9/1967 |
| DE | 25 49 585 A | 11/1976 |
| DE | 195 09 731 A | 9/1996 |
| EP | 0 012 114 | 6/1980 |
| EP | 0 292 424 | 11/1988 |
| GB | 528 008 A | 4/1939 |

OTHER PUBLICATIONS

Enzyklopädie Naturwissenschaft und Technik, Verlag Moderne Industrie, Munich 1980.
Schweizer Ingenieur und Architekt, Issue No. 3, dated Jan. 18, 2000.
Database WPI Week 9841, patent application No. XP–002114151.
Database WPI Week 197848, patent application No. XP–002142098.

* cited by examiner

Primary Examiner—Carl D. Friedman
Assistant Examiner—Kevin McDermott
(74) Attorney, Agent, or Firm—Burns Doane Swecker & Mathis, LLP

(57) ABSTRACT

Through the use of crushed foam glass derived from old glass or blast-furnace slag by way of aggregate for a casting compound which is bound with a binder, a building material was obtained that enables very wide-ranging applications.

46 Claims, No Drawings

LIGHTWEIGHT CONCRETE

This application is a 371 national stage of PCT International Application No. PCT/CH00/00219 filed Apr. 14, 2000.

FIELD OF THE INVENTION

The invention relates to a flowable and settable casting compound, in particular lightweight concrete, with a binder, in particular cement, and at least one lightweight aggregate, to a prefabricated element, to a structural member that is cast in situ, and also to a process for producing structured surfaces in cast structural members and elements.

BACKGROUND OF THE INVENTION

Foam glass is offered on the market in plate form or as bulk material. For the purpose of producing plates of foam glass, new glass is mixed with a range of additives, is baked in moulds and thereby foamed, is then thoroughly cooled and cut into plates. The foam-glass lumps of the bulk material are fragments of a foam-glass layer which is produced by baking, at up to about 900 degrees, an old-glass powder which has been mixed with mineral additives. The origin of the glass plays a minor role. New glass can also be used for producing the foam-glass ballast. The process for producing this foam-glass ballast is described in European Patent No. 0 292 424, for example.

Foam glass is known as an inert insulating material with relatively high compressive strength. Foam-glass ballast is employed, inter alia, for perimeter insulations, granular subbases beneath structures, as lightweight ballast for pressure-equalising layers in road construction. In this connection the low weight per unit volume and the insulating property of the foam glass are primarily utilised, but its good and stable compressibility is also utilised. Furthermore, the permeability in respect of water even of the compressed structure of the ballast is valued in particular. The permeability in respect of water is based on the large cavity cross-sections between the foam-glass lumps of practically uniform size. Thanks to the absence of fines, the permeability in respect of water an be utilised permanently without any risk of flushing out. Since the individual foam-glass lumps in the texture interlock by claw action with the sharp edges in the innumerable broken-open gas pores of the surface of the foam-glass lumps, foam-glass ballast exhibits the very steep angle of repose of about 45°. It can therefore also be employed in the domain of securing slopes.

The term 'glass' in this context is to be understood to mean a broad range of vitrified and glass-like materials, such as new glass of any composition, old glass of any origin, slag from incineration plants and also, in particular, slag from blast furnaces. It has been shown that blast-furnace slag from steelworks can be processed into foam glass in a process that consumes practically no energy. The product that is obtained thereby apparently exhibits an even higher compressive strength and a lower weight per unit volume than the foam-glass product derived from old glass which is described further below. In addition, its cost is far more favourable than that of the foam glass derived from old glass with relatively high expenditure of energy.

According to the "*Enzyklopädie Naturwissenschaft und Technik*", Verlag Moderne Industrie, Munich 1980, a normal concrete (normal heavy concrete) has a bulk density from 2.2 to 2.5 t/m$^3$, a compressive strength from 16 to 60 MPa (=N/mm$^2$) and a thermal conductance of 1.97 W/mK. In order to obtain a lower weight and a lower coefficient of thermal conduction, some of the aggregates constituted by sand, gravel or stone chippings can be replaced by various lighter aggregates with inclusions of gas, e.g. pumice stone or expanded clay, or a viscous ultra-fine mortar can be interspersed with gas bubbles. As a result, lightweight concrete is obtained. According to the aforementioned encyclopedia, lightweight concrete can be subdivided into four groups. 1st Group: dense lightweight-aggregate concrete which can be used structurally for high-rise and industrial buildings as well as bridges. Parameters: bulk density 1.4 to 1.9 t/m$^3$; compressive strength 16 to 45 MPa (=N/mm$^2$) and thermal conductance 0.58 to 1.38 W/mK. For this concrete, use is made of the normal concrete aggregates, but they are partially replaced by lightweight aggregates. Expanded clay and expanded slate are specified as special aggregates. The grain-structure type is closed. Foam-glass lumps are proposed in EP 0 012 114 and in JP-A-10 203836 as a further possible lightweight aggregate for a concrete pertaining to this first group.

In EP 0 012 114 a process is described for producing a foam-glass granulate from a powdered glass with pasty expanding agents which consist of organic and inorganic substances. The granulate consists of fragments of a foam-glass body and comprises 100,000 to 3 million small bubbles having approximately the same size per cm$^3$ of granulate compound. It exhibits a compressive strength of 130 kg/cm$^2$. In one embodiment the grains of the granulate have beaded edges. In order to obtain the beaded edges, the granulate is worked mechanically, e.g. in a device resembling a sugar-coating drum, in such a manner that the edges are crushed. The granulate that is obtained with this process is, according to the disclosure, fine-pored and very lightweight and can be used as an aggregate for lightweight concrete or as a filler for plastics.

Proceeding from known processes for producing globular foam-glass bodies that find application as filling material for lightweight mortar and from known processes for producing plate-like foam glass, in JP-A-10 203836 a process is described which is practically identical to the process according to the substantially older patent specification EP 0 292 424. With this process, according to the disclosure, a foam glass having an undefined massive form is obtained which exhibits a relative density of 0.2, a proportion of adhering water of 7% and an average grain diameter of 3 cm. The following are proposed as advantageous uses of this foam glass:

raising of the ground level in the case of a soft and weak subsoil, whereby a lateral flowing movement can be suppressed,
  drainage layer, e.g. beneath tennis courts,
  thermal insulation in the roof area or floor area,
  weight-reducing aggregate added to concrete,
  soundproofing and earthquake protection.

A second group of lightweight concrete is constituted, according to the "Enzyklopädie Naturwissenschaft und Technik", by particulate-pored lightweight aggregate concrete. The latter can be employed structurally and for thermal insulation in the form of cavity blocks, large slabs and large blocks. Parameters: bulk density 1.0 to 1.4 t/m$^3$; compressive strength 2.5 to 8 MPa (=N/mm$^2$) and thermal conductance 0.41 to 0.58 W/mK. Expanded clay and expanded slate, but also pumice slag, sintered ash and other aggregates are specified as aggregates for this concrete. The grain-structure type is open.

A third group is constituted by aerated concrete (gas-silicate concrete, foamed concrete), which can be employed structurally and for thermal insulation in the form of structural members for walls, roofing slabs and insulating concrete. Aerated-concrete blocks are also known. Parameters: bulk density 0.3 to 1.0 t/m$^3$; compressive strength 0.5 to 15 MPa (=N/mm$^2$) and thermal conductance 0.058 to 0.41 W/mK. Fine sand, fly ash and slag sand are specified as aggregates for this concrete. The grain-structure type is fine-pored.

According to the aforementioned encyclopaedia, insulating concrete, which can be employed merely for thermal insulation in the form of insulating slabs, constitutes a fourth group. Parameters: bulk density 0.3 t/m$^3$; compressive strength inadequate for load-bearing units, and thermal conductance 0.035 to 0.35 W/mK. Kieselguhr and pearlite are specified as aggregates for this concrete.

These four concrete groups show clearly that in the case of the known types of lightweight concrete the compressive strength falls below 16 N/mm$^2$ as soon as the coefficient of thermal conduction falls below 0.5 W/mK or the weight per unit volume falls below 1.4 t/m$^3$. It can also be inferred that in the case of a weight per unit volume of about one tonne per cubic metre a maximum compressive strength of 15 N/mm$^2$ and no better thermal conductance than about 0.4 W/mK are attained. A compressive strength of over 8 MPa is only attained if use is made of expanded clay or expanded slate by way pf aggregate or if aerated concrete is produced from finely ground aggregates and gas-forming additives. However, expanded clay and expanded slate utilise limited resources, and aerated concrete, for reasons of quality assurance, cannot be used for load-bearing cast-in-place concrete.

From this survey it can therefore further be gathered that there is no constructional concrete capable of being cast on the building site having a bulk density below 1.4 t/m$^3$ and a thermal conductance below 0.58 W/mK. Aerated concrete could presumably also be cast on the building site. However, its quality depends very much on the external conditions. The attainment of a desired formation of pores, and hence of a heat-insulating property, a lightness and a load-bearing strength being striven for, indeed even a volume being striven for, is therefore not guaranteed. Old glass has been employed for some time as a concrete aggregate. For this purpose, old glass is crushed so as to form glass-making sand. In *Schweizer Ingenieur und Architekt,* Issue No. 3 dated Jan. 18, 2000, the Begleitkommission SIA 162 (a Swiss commission promoting structural engineering) published "Betonbauten" (Concrete Structures), an opinion on the use of old glass as a sand substitute in concrete. In this article the risk is pointed out that, with reference to the alkali-silicate reaction, glass is an endangered aggregate and can react with the alkalis dissolved in the pore water of the concrete. This reaction results in voluminous reaction products which can lead to internal stresses and cracks and to the destruction of the concrete texture. It is further pointed out that materials very different from glass, such as lids (aluminium, lead) and labels etc, are crushed with the old glass and can lead to additional problems. Besides, it is pointed out in this communication that the bond between the cement matrix and the smooth surface of the glass grains is rather weak and that the use of glass can make later recycling of the concrete difficult. For this reason the use of glass as a sand substitute in constructional concrete is advised against by the Begleitkommission SIA 162 and by AG SIA 162-4 "Beton" (Concrete).

The object of the invention is therefore to create a flowable, setting compound with, in comparison with the state of the art, relevantly better and predeterminable properties with respect to weight per unit volume, compressive strength and/or thermal conductance. In particular, a constructional concrete with granulated lightweight aggregates is to be proposed that is suitable for building construction and civil engineering and capable of being cast on the building site in a formwork as cast-in-place concrete. Waste products or recycled primary material are to be capable of being used for the lightweight aggregates.

SUMMARY OF THE INVENTION

In accordance with the invention a flowable and settable casting compound with a binder and at least one lightweight aggregate is characterised in that the lightweight aggregate consists of crushed foam-glass lumps and, with the exception, if need be, of sand and still finer admixtures such as fillers, all the granulated aggregates consist of crushed foam glass.

DETAILED DESCRIPTION OF PREFERRED EMBODIMENTS

Cement enters primarily into consideration by way of binder. This results in a lightweight concrete with crushed foam-glass lumps by way of lightweight aggregate. Further inorganic, but also organic, binders can also be used. The lightweight aggregate may be present in the form of a single aggregate or may be mixed with traditional small-grained aggregates such as sand. The grain size in the course of crushing or in the course of subsequent screening of the crushed grain can be chosen by virtue of the use of crushed foam-glass lumps. Depending on the field of application, a monogram material or a mixture of various grain sizes corresponding to a desired screenan-alysis curve is striven for. The use of crushed foam-glass lumps in a settable casting compound is not only able to lower the weight per unit volume of the article that is cast from the casting compound; by virtue of the surface structure of the crushed lumps, which exhibits a multitude of pores that have been broken open, the bond between binder and foam-glass lumps is, for example, also very intense. In the case of cement the bond is greater than between gravel aggregate and cement. This excellent bond enables a high compressive strength and a better tensile bending strength in comparison with the normal heavy concrete.

Such a lightweight concrete is distinguished by a behaviour similar to that of normal heavy concrete with respect to shrinkage and creep. The transverse-extension ratio and the coefficient of vapour conduction are to be estimated as in the case of normal concrete. However, the coefficient of thermal conduction, which is dependent on the weight per unit volume, is clearly lower than in the case of other, particulate-pored lightweight-aggregate concrete. The coefficient of thermal expansion is about 15% below that of a normal concrete. The fire resistance is high; a high resistance to frost and to freeze-thaw salt can be attained by virtue of pore-forming admixtures.

In the case where use is made of a monogram material by way of lightweight aggregate, a very lightweight seepage concrete having a large through-flow cross-section can be produced, or, in the case of relatively small grain, an insulating plaster can be produced. In the case where use is made of aggregates with a Fuller screen-analysis curve, a pressure-resistant, closed grain structure can be obtained. In this case all the fractions may be formed by the foam-glass lumps, or one or more grain sizes, e.g. 0 to 1 mm, may be added as ordinary sand. The screen-analysis curve may also differ in purposeful manner from the Fuller curve.

As in the case of normal heavy concrete or traditional lightweight concrete, one or more additives may also be added to the casting compound. Advantageous in particular is a pore-forming additive which, in addition to the positive effect on the resistance of concrete to frost and to freeze-thaw salt, also may replace a certain proportion of fine particles in the aggregate. A filler may also be employed for the purpose of reducing the proportion of cement.

Thanks to the closed-pore structure of the foam glass, even under the influence of moisture the foam-glass lumps remain dry in their interior and the pores remain filled with gas. The foam glass may be embedded in a wet mortar without the pore content being diminished as a result. Since foam glass is inert, any reaction upon contact of the lightweight aggregate with other substances, e.g. acids and oils, remains out of the question. The anticorrosive protection of a steel reinforcement by virtue of the alkalinity of the concrete is not endangered, since the glass has no influence on the chemistry of the concrete in this regard.

An organic resin or another synthetic material, lime, casein, water-glass etc may also be employed by way of binder. Synthetic materials are suitable, in particular, for smaller prefabricated units such as drainage gutters, shaft floors, water bars etc. Lime and casein can be employed more easily in the plaster and surface regions.

The foam-glass lumps are advantageously crushed in angular manner. As a result of angular crushing of the original foam-glass bodies, hardly any of their volume is lost. For initial attempts to produce foam-glass concrete the applicant followed the expert opinion that a round grain is necessary for a good texture of concrete and so produced round grain. In contrast to angular crushing of the foam glass, however, crushing of a round grain leads to massive losses and to an excessive yield of fines. Although crushed foam-glass lumps become wedged together with one another with their edges and corners and interlock by claw action with large interspaces, the workability and the compressibility of a casting compound with angular foam-glass fragments by way of aggregate are, surprisingly, just as good as those of a casting compound with round grain.

If a dense, pressure-resistant and lightweight structure is to be obtained, the foam-glass lumps are advantageously present in a casting compound in differing grain sizes. In order to obtain a structure from merely lightweight aggregates and binder, the lightweight aggregates advantageously exhibit a screen-analysis curve approximating to the Fuller curve.

With a view to producing a curve of the aggregates that conforms to requirements, foam glass is crushed, screened out in fractions, and the fractions are mixed in purposeful manner. The composition of the casting compound or of the aggregates with respect to quantity, material and grain size of the fractions is expediently estimated on the basis of a material-space calculation. By this means, a specific requirement with respect to lambda value and compressive strength of the structural member can be approximated to. This permits the production of specific compositions for purposeful ranges of application. Thus, e.g. for window cornices, the heat-insulating property can be improved at the expense of the compressive strength, while for cast-in-place concrete for basement walls the compressive strength can be increased at the expense of the heat-insulating property. For the sake of safety, test cubes are examined prior to construction work taking place, and in the process the calculated parameters are remeasured, so that the composition an be adapted on the basis of the measurements.

There is advantageously added to the casting compound a fibre reinforcement or chip reinforcement which, like pore-forming additive, may likewise replace fines such as fillers or aggregates with a grain size of 0 to 0.5 mm. In addition, this reinforcement increases the load-bearing capacity of the set compound.

The foam-glass lumps are advantageously produced from glass and/or glass-like material and from an activator. The activator, which brings about the formation of pores in the glass in the course of expansion in the expanding furnace or in the expanding pipe, is composed of silicon carbide and carbon as well as borax or at least one metal oxide.

Liquid slag or liquid glass can be foamed directly by mixing a gas-forming foaming agent into the liquid melt. The foaming agent releases gas immediately after contact with the hot slag and causes the latter to foam up.

In the case of a currently unpublished process for the foaming of blast-furnace slag from steelworks, the mixing-in operation takes place as follows. Liquid slag is poured onto a rotating disk. By virtue of centrifugal force, the slag spreads out on the disk so as to form a thin film having a large surface. The foaming agent, a mixture comprising silicon carbide and carbon as well as borax or at least one metal oxide, is now sprinkled in powder form onto this film, whereupon the slag immediately begins to foam up. At the edge of the disk the slag/foaming-agent mixture is flung outwards against a tubular wall. Since the temperature of the slag is still above its melting temperature, it continues to flow downwards, foaming up, along the wall. At the lower edge of the wall the foam drips off onto a plate conveyor, with which it is transported away continuously.

The temperature of the slag foam which is generated is above 1,000° C. At least at first, the foam on the conveyor belt is therefore still soft and viscous in its interior. As a result of being allowed to cool down passively in contact with air, the slag foam breaks up into lumps of practically uniform granulation. These hot slag-foam lumps are heaped up by the plate conveyor.

With a view to producing foam-glass lumps from old glass, the powder consisting of a glass or glass-like material is mixed with a quantity of 1.5 to 2.5% of the powder-form activator and the mixture is expanded in a single process step at a temperature between 750 and 950° C.

The resulting product is a glass-gall body which, given suitable conditions during cooling, breaks up automatically into a monogram material. The process for producing such a foam glass is described in European Patent EP 0 292 424, to which reference is made expressly at this point. In this process one of the following mixtures is proposed by way of activator:

A) 50 to 80 parts by weight silicon carbide, 20 to 50 parts by weight borax and 1 to 10 parts by weight carbon in the dry state, or B) 85 to 95 parts by weight silicon carbide, 1 to 10 parts by weight manganese oxide and 1 to 10 parts by weight carbon, or C) 45 to 50 parts by weight silicon carbide, 1 to 10 parts by weight carbon, 20 to 26 parts by weight copper oxide and 20 to 26 parts by weight lead oxide in the dry state.

With a view to ensuring a good mode of operation of the process prior to the homogenising of activator and powdered glass, metal oxide, e.g. copper oxide or lead oxide, can also be added to the powdered glass to be mixed with activator B). The quantity of metal oxide is specified at 0.5 to 1.5 percent by weight of the powdered glass. By way of carbon, furnace black is preferred. The latter oxidises almost completely, which is an advantage for the definition of the pore size. By way of manganese oxide, use may be made of brownstone.

The foam glass from this process is distinguished, like the slag foam, by a high compressive strength. Both are neutral as regards odour and are inert. The properties can be varied in purposeful manner. At least glass gall can be pigmented by means of colouring additives. The addition of lead in the form of lead oxide or lead glass lowers, for example, the permeability in respect of radiation.

The foam-glass lumps for such a casting compound advantageously exhibit a compressive strength of over 1 $N/mm^2$, preferably over 3 $N/mm^2$, in particularly preferred manner on average over 5 $N/mm^2$. The compressive strength of the foam-glass lumps that result from the process described above may exhibit [values] up to, on average, 6 $N/mm^2$ or more. The high compressive strength of the lightweight aggregate guarantees a high compressive strength of the set casting compound. The compressive strength of reinforced test articles reached, thanks to this value of the aggregate foam glass which is used exclusively therein, over 30 $N/mm^2$, even 45 $N/mm^2$ and more, which corresponds at least to the limiting range between concrete Types I and II and hence to a concrete that is suitable for medium-stressed and highly stressed structural members made of concrete and steel-reinforced concrete.

The foam-glass lumps advantageously have closed cells, in order that no liquid is able to penetrate into the pores. By this means, the insulating property of the lump, for example, remains unchanged, even in a wet environment. The weight per unit volume of such a compound can also, for example, only change within certain limits as a result of intake of water. The pores cannot be filled by the binder.

In the case of such a casting compound for a special use, e.g. lightweight backfill concrete for false floors, wood-concrete composite, statically loadable lightweight-concrete prefabricated units such as staircases, supports, lintels, non-load-bearing elements such as parapets, partition walls, heat-insulating elements, floors, wall coverings, sound-proofing elements, the bulk density and/or pore size of the foam-glass lumps is advantageously matched to this use of the casting compound. It can be assumed that for high compressive strength a high weight per unit volume and a small pore size are to be striven for. For airborne-sound-absorbing properties, an open, extensive pore framework with high weight per unit volume is presumably advantageous, for low weight per unit volume a large-pored, thin-walled configuration of the foam glass is presumably advantageous.

For a special use of the casting compound, e.g. radiation shielding in X-ray zones, for air-raid shelters or for the purpose of screening production zones having emissions of radiation, or decorative surfaces in the case of cast floors, tiles, ledges, etc, the properties of the foam-glass lumps are advantageously matched to this use of the casting compound. To this end, a purposeful formulation of the composition of the raw materials for the production of the foam-glass lumps is expedient, for example by addition of lead or pigments.

Lightweight aggregates for concrete have hitherto been charged in the form of monogram material into the concrete compound, as a result of which a special grain size was added to the aggregates exhibiting approximately a Fuller screen-analysis curve. But in the case of a flowable and settable casting compound, in particular lightweight concrete, with a binder, in particular cement, and at least one lightweight aggregate, the aggregates advantageously exhibit a balanced screen-analysis curve overall. To this end, the lightweight aggregate exhibits a screen-analysis curve that is graded between 0 and the largest grain size with at least 3 grain sizes, preferably more than 5 grain sizes, in particularly preferred manner at least 8 grain sizes. The proportion of lightweight aggregate can be increased by this means. The lightweight aggregate in this case advantageously constitutes at least 80% of the aggregate, preferably 90%, in particularly preferred manner 100%.

The invention also relates to a prefabricated element that is formed from a binder and at least one aggregate, e.g. a tile or a facing slab, a paving stone, a decorative bar, a parapet element, a prefabricated staircase, a shear wall, a floor slab, a supporting beam, a lintel, cornices, concrete blocks as reconstructed stonework etc. In accordance with the invention such an element comprises crushed foam-glass lumps by way of aggregate. The advantages thereof have been explained above. In the course of prefabrication, in particular the weight of the prefabricated units is the decisive factor. By virtue of the excellent compressive strength and tensile bending strength of the material at low weight per unit volume, inter-floor staircases, for example, can be produced in one piece and displaced with a crane. In comparison with normal heavy concrete of the same weight, wall elements and load-bearing structural members can exhibit up to twice the volume.

Such a prefabricated element may advantageously exhibit a cut, sawn, ground and/or milled surface. The surface that is obtained by grinding, sawing etc shows the grain structure with the porous foam-glass aggregate. This structure can, for example, be utilised decoratively, acoustically or for the purpose of better adhesion of plasters etc. By way of examples, the following may be cited: tiles, constituted by disks that are cut away by a bar, wall panels having a decorative and sound-scattering effect, profiled bars for decorative purposes with the same surface as the separately displaced wall elements, lightweight—and therefore considerate to the back in the course of displacement—paving stones with a non-slip surface. There are hardly any limits to the possible applications.

The invention likewise also relates to a structural member pertaining to multi-storey buildings and civil-engineering structures that is cast in situ with foam-glass lumps by way of aggregate. Fields of application thereof are, for example, load-bearing and non-load-bearing walls, pillars, ceilings and floors, piles, thermally insulating foundation slabs, road surfaces, bridges, supporting floors and non-slip flooring materials. Practically any structural member that can be produced in heavy concrete or traditional lightweight concrete can also be produced from foam-glass concrete. In this connection the special advantages can be utilised, in particular lightness and compressive strength, closed porosity and heat-insulating capacity, resistance to chemicals, castability, pumpability, matchability of the mixture etc.

Such a structural member or element advantageously exhibits a weight per unit volume below 1,400 $kg/m^3$, preferably below 1,200, in particularly preferred manner around or below 1,000 $kg/m^3$. Lightweight structural members often enable a reduction of the foundation, a diminution of the dimensions of the structural member or an enlargement of the spans. With lower specific weight, elements can be so much larger. The reduction in the dead weight of the structures is a great advantage, in particular, in the construction of bridges or high-rise buildings, or for structures over terrain that bears loads poorly. With such lightweight building material, encasements of cables can be constructed so as to float in water.

Such a structural member or element advantageously exhibits a compressive strength of at least 12, preferably 18, in particularly preferred manner over 25 N/mm². Starting from strength classes Bn 150 and Bn 250, the lightweight concrete or a comparable lightweight building material can be used for statically loaded structural members.

If the structural member or element exhibits a thermal conductivity of max. 0.4, preferably below 0.35, in particularly preferred manner below 0.32 W/mK, it can in addition be employed in heat-insulating manner and thereby in a manner increasing the safety of a building in terms of fire.

A structural member or element is advantageously distinguished by a ratio of compressive strength in N/mm² to weight per unit volume (dry) in kg/m³ of over 1:80, preferably over 1:60, in particularly preferred manner over 1:50. The greater the value of this ratio, the more favourable it is, since the same or greater loads can be carried away with a lighter structural member.

The invention also relates to a process for producing structured surfaces in cast structural members. With this process a casting compound with a binder and foam-glass lumps by way of aggregate is poured into a formwork or mould and after the casting compound has set the surface is eroded. With a view to eroding the surface, the outer skin which is formed by the binder can be abraded, milled off, scraped off, picked, bush-hammered etc. The new surface is then moulded by the textural structure with the pore-rich aggregate. This results in a decorative, non-slip, acoustically interesting surface.

This surface can then be sealed, in order to close the pores that have been broken open. The binder and/or the foam-glass lumps can be pigmented prior to casting. The colouring effect of the structural member can be created by this means.

The invention will be elucidated in more detail below on the basis of examples. The baked foam glass leaves the expanding furnace in a plate thickness that is determined by the input-side layer thickness of the glass dust. By reason of the temperature differences arising in the plate, this foam-glass plate breaks up, depending on the thickness of the plate and depending on its surface structure, into lumps of uniform size. The smallest standard dimensions of the lumps are about 10/25 mm. For smaller grain sizes, this grain has to be crushed. In a first series of experiments with foam-glass concrete, by simple crushing of the monogram material emerging from the expanding furnace a screen-analysis curve of the foam-glass lumps is obtained that approximates roughly to the Fuller curve that is tried and tested for concrete.

The 0 to 16 mm screen-analysis curve of the foam glass that was used in this series of experiments has a proportion of 28% of the fraction between 0 and 1 mm (gravel for concrete about 12%), 18.3% between 1 and 4 mm (gravel for concrete about 24%) and 53.7% between 4 and 16 mm (gravel for concrete about 64%). In this case, in comparison with the ideal proportions of the Fuller curve being striven for, the portion between 0 and 0.25 mm is represented in clearly below-average proportion and the portion between 0.25 and 1 mm is represented in clearly above-average proportion. An above-average proportion of cement therefore has to be reckoned with. In addition, a pore-forming additive is mixed in. Four concrete mixtures have been singled out below by way of examples from this first series of experiments.

A first concrete is produced from a 650 kg/m³ cement, without filler, with 258 kg/m³ water, 120 kg/m³ foam glass 0–1 mm, 79 kg/m³ foam glass 1–4 mm, 231 kg/m³ foam glass 4 to 16 mm and 3.9 kg/m³ concrete admixture for the purpose of forming pores in the mortar. A concrete results from this which after 28 days exhibits a weight per unit volume of 1,350 kg/m³. This figure is reduced after drying to 1,220 kg/m³. The compressive strength exhibits [a value of] 25 N/mm², the tensile bending strength exhibits [a value of] 3 N/mm². The thermal conductivity of the dried concrete amounts to about 0.38 W/mK, the modulus of elasticity amounts to about 8,500 N/mm².

A second concrete with 550 kg/m³ cement, 153 l/m³ water, 3.3 kg/m³ of the concrete admixture and 460 kg/m³ of the foam glass with the same screen-analysis curve results in a concrete with 1,265 kg/m³ after 28 days. When dried it still weighs 1,100 kg/m³. The compressive strength after 28 days is 22 N/mm², the tensile bending strength is 2.8 N/mm². The thermal conductivity is around 0.34 W/mK, the modulus of elasticity is around 7,000 N/mm².

A concrete consisting of 450 kg/m³ cement, 233 l/m³ water, 2.7 kg/m³ pore-forming concrete admixture and 505 kg/m³ of the foam glass exhibits after 28 days a wet weight per unit volume of 1,190 [kg/m³], 1,040 dry. The compressive strength at this time is 19 N/mm², the tensile bending strength is 2.5 N/mm². The thermal conductivity and the modulus of elasticity come to about 0.31 W/mK and 6,000 N/mm².

A concrete which still weighs 970 kg/m³ when dried is produced from 350 kg/m³ cement, 217 l/m³ water, 2.1 kg/m³ concrete admixture and 535 kg/m³ foam glass 0–16 mm having the same screen-analysis curve. The compressive strength and tensile bending strength after 28 days are 12 and 2.2 N/mm², respectively. The heat-insulating property attains a value of about 0.27 W/mK and the modulus of elasticity attains a value of about 4,500 N/mm².

With these values, despite clear divergences of the aggregates from a Fuller screen-analysis curve that has hitherto been regarded as ideal, a concrete is already obtained that no longer fits the current classifications. The foam-glass concrete is, surprisingly, castable and pumpable like ordinary concrete. The segregation of the concrete is insignificant even in the event of vibration. Hence a concrete with a bulk density below 1.4 t/m³ is obtained that is capable of being processed on the building site like ordinary concrete, exhibits a compressive strength at least three to five times that of a traditional lightweight-aggregate concrete that is comparable as regards weight per unit volume and at the same time a heat-insulating property that is around 25 to 35% superior.

The grain-size distribution of the foam glass can be improved with a drum crusher. The grain-size distribution in the foam-glass aggregate can be optimised by crushing in the drum crusher, subsequent screening-out, and compilation of the desired screen-analysis curve from the various grain sizes that have been screened out. By virtue of an improvement in the screen-analysis curve of the aggregates in favour of the compressive strength and by virtue of the addition of steel-fibre reinforcement, in a further development of the invention compressive strengths up to over 30 N/mm² can be obtained in the case of a weight per unit volume of a little above 1,300 kg/m³. This results in a performance ratio between compressive strength and weight per unit volume, in the stated units, of over 1:45. This corresponds to the performance of a heavy concrete having a weight per unit volume of 2.5 t m³ and a compressive strength of 55 N/mm². With good granulometric composition the compressive strengths of a lightweight concrete according to the invention with 900 to 1,000 kg/m³ are still between 13 and 17 N/mm². With a weight per unit volume of 1,000 to 1,100 kg/m³, compressive strengths between 17 and 21 N/mm² can be obtained; at 1,100 to 1,200 kg/m³, between 21 and 26 N/mm². An improvement in these values in the course of further refinement of the formulations is to be expected. In the case of a compressive strength of 45 N/mm², as can be measured in respect of a reinforced structural member, the above ratio is over 1/30.

To sum up, it can be said that, by virtue of the use of crushed foam glass by way of aggregate for a casting compound which is bound with a binder, a building material was obtained that enables very wide-ranging application. Valued in particular are:

its properties relating to the physics of construction, such as
high compressive strength and high uprooting resistance at low weight per unit volume and low thermal conductance,
high fire-resisting capacity thanks to a low coefficient of thermal conduction and a low modulus of elasticity,
good constancy of volume thanks to a low coefficient of thermal expansion,
low water-absorbing capacity thanks to a closed-pore, non-absorbent aggregate,
high anticorrosive protection for the steel reinforcement thanks to a high content of hardened cement paste;
but also its workability, in particular
its miscibility and transportability (low weight),
its castability and pumpability,
its compressibility and vibratability.

In addition, the optical, acoustic and/or tactile effect of the crushed, sawn or ground structural member is valued in
cast or placed flooring materials,
cast or transferred structural members forming visible surfaces, e.g. on walls and ceilings,
acoustic elements and soundproofing elements,
decorative elements.

Experiments with foam-glass lumps obtained from blast-furnace slag are not currently available. The results cited above with foam-glass lumps derived from old glass can probably be surpassed with the blast-furnace-slag product by reason of the lightness and compressive strength thereof. The environmental compatibility and ecological value added resulting from waste products such as old glass or blast-furnace slag are further qualities of this lightweight building material that are not to be underestimated. In addition, the production costs of the foamed blast-furnace slag are low, so the product can be taken into consideration as competition to traditional gravel for concrete.

What is claimed is:

1. A light weight aggregate for a casting compound that is bonded with a binder, comprising:
a plurality of foam glass lumps of crushed foam glass, the foam glass lumps exhibiting a screen-analysis curve that is graded between 0 and a largest grain size with at least 3 fractions.

2. The light weight aggregate according to claim 1, wherein the screen-analysis curve is graded between 0 and the largest grain size with more than 5 fractions.

3. The light weight aggregate according to claim 2, wherein the screen-analysis curve is graded between 0 and the largest grain size with at least 8 fractions.

4. A method to produce a casting compound comprising the steps of:
providing a light weight aggregate; and
binding the light weight aggregate with a binder,
wherein the light weight aggregate comprises a plurality of foam glass lumps of crushed foam glass, the foam glass lumps exhibiting a screen-analysis curve that is graded between 0 and a largest grain size with at least 3 fractions.

5. The method according to claim 4, wherein the screen-analysis curve is graded between 0 and the largest grain size with more than 5 fractions.

6. The method according to claim 5, wherein the screen-analysis curve is graded between 0 and the largest grain size with more than 8 fractions.

7. A flowable and settable casting compound, comprising:
a binder; and
a light weight aggregate comprising a crushed foam glass, wherein the crushed foam glass exhibits a screen-analysis curve that is graded between 0 and a largest grain size with at least 3 fractions.

8. The casting compound according to claim 7, wherein the screen-analysis curve is graded between 0 and the largest grain size with more than 5 fractions.

9. The casting compound according to claim 8, wherein the screen-analysis curve is graded between 0 and the largest grain size with at least 8 fractions.

10. The casting compound according to claim 7, wherein the binder is cement.

11. The casting compound according to claim 7, wherein the screen-analysis curve is balanced overall.

12. The casting compound according to claim 7, wherein the screen-analysis curve approximates a Fuller curve.

13. The casting compound according to claim 7, wherein an amount of the crushed foam glass constitutes at least 80% of the light weight aggregate.

14. The casting compound according to claim 13, wherein the amount of the crushed foam glass constitutes at least 90% of the light weight aggregate, and a remaining 10% includes sand.

15. The casting compound according to claim 14, wherein the amount of the crushed foam glass constitutes approximately 100% of the light weight aggregate.

16. The casting compound according to claim 7, wherein substantially all aggregate having a grain size of 4 mm or more is crushed foam glass.

17. The casting compound according to claim 7, wherein all of the aggregate having a grain size up to 4 mm is crushed foam glass.

18. The casting compound according to claim 7, wherein the foam glass is crushed in an angular manner.

19. The casting compound according to claim 7, comprising a fibre reinforcement or a chip reinforcement.

20. The casting compound according to claim 7, wherein the foam-glass lumps exhibit an average compressive strength of over 1 N/mm².

21. The casting compound according to claim 20, wherein the average compressive strength is over 5 N/mm².

22. The casting compound according to claim 7, wherein a bulk density or a pore size of the foam glass is matched to an application chosen from the group consisting of a lightweight backfill concrete, a statically loadable lightweight-concrete prefabricated unit, a non-load-bearing element, a floor, and a soundproofing element.

23. The casting compound according to claim 7, wherein the light weight aggregate comprises lead or a pigment added to the foamed glass.

24. The casting compound according to claim 23, wherein when lead is added to the foamed glass, the casting compound is used in a radiation shield.

25. The light weight aggregate according to claim 23, wherein when the pigment is added to the foamed glass, the casting compound is used in a decorative surface.

26. A structural member formed from a casting compound comprising:

a binder; and a plurality of foam glass lumps of crushed foam glass, the foam glass lumps exhibiting a screen-analysis curve that is graded between 0 and a largest grain size with at least 3 fractions, wherein the structural member is cast in situ as a prefabricated element.

27. The structural member according to claim 26, wherein the prefabricated element used in a multi-storey building or a civil-engineering structure.

28. The structural member according to claim 26, wherein the structural member has a cut, a sawn, a ground or a milled surface.

29. The structural member according to claim 26, wherein the prefabricated element has a weight per unit volume less than 1,400 kg/m$^3$.

30. The structural member according to claim 24, wherein the weight per unit volume is less than 1,200 kg/m$^3$.

31. The structural member according to claim 30, wherein the weight per unit volume is less than 1,000 kg/m$^3$.

32. The structural member according to claim 26, wherein the prefabricated element has a compressive strength of at least 12 N/mm$^2$.

33. The structural member according to claim 32, wherein the compressive strength is at least 18 N/mm$^2$.

34. The structural member according to claim 33, wherein the compressive strength is over 25 N/mm$^2$.

35. The structural member according to claim 26, wherein the structural member has a thermal conductivity of max. 0.4 W/mK.

36. The structural member according to claim 35, wherein the thermal conductivity is less than 0.35 W/mK.

37. The structural member according to claim 36, wherein the thermal conductivity is less than 0.32 W/mK.

38. The structural member according to claim 26, wherein the structural member has a ratio of compressive strength in N/mm$^2$ to weight per unit volume (dry) in kg/M$^3$ of greater than 1:80.

39. The structural member according to claim 38, wherein the ratio is greater than 1:60.

40. The structural member according to claim 39, wherein the ratio is greater than 1:50.

41. A process for producing a structured surface in a cast structural member, the process comprising the steps of:

pouring into a formwork or mold a casting compound, the casting compound having a binder and a plurality of crushed foam-glass lumps by way of aggregate;

setting of the casting compound; and eroding a surface of the casting compound.

42. The process according to claim 41, wherein the step of eroding the surface is grinding or bush-hammering the surface.

43. The process according to claim 41, comprising the step of sealing the surface.

44. The process according to claim 41, comprising the step of pigmenting the binder or foam glass prior to the pouring step.

45. The process according to claim 41, comprising the steps of:

crushing the foam-glass; and screening the foam-glass in fractions, wherein the crushed foam glass separated into fractions is mixed so as to conform to a predetermined requirement.

46. The process according to claim 45, comprising the step of estimating a composition of the casting compound or the aggregate on a basis of a material-space calculation, the estimating step considering a quantity, a material, and a grain size of the foam-glass fractions.

* * * * *